（12） United States Patent
Veeramachaneni et al.

(10) Patent No.: US 10,264,027 B2
(45) Date of Patent: Apr. 16, 2019

(54) COMPUTER-IMPLEMENTED PROCESS AND SYSTEM EMPLOYING OUTLIER SCORE DETECTION FOR IDENTIFYING AND DETECTING SCENARIO-SPECIFIC DATA ELEMENTS FROM A DYNAMIC DATA SOURCE

(71) Applicant: PatternEx, Inc., San Jose, CA (US)

(72) Inventors: Uday Veeramachaneni, San Jose, CA (US); Vamsi Korrapati, San Jose, CA (US); Constantinos Bassias, San Jose, CA (US); Ignacio Arnaldo, San Jose, CA (US)

(73) Assignee: PATTERNEX, INC., San Jose, CA (US)

( * ) Notice: Subject to any disclaimer, the term of this patent is extended or adjusted under 35 U.S.C. 154(b) by 0 days.

(21) Appl. No.: 15/662,323

(22) Filed: Jul. 28, 2017

(65) Prior Publication Data

US 2017/0339192 A1 Nov. 23, 2017

Related U.S. Application Data

(63) Continuation of application No. 14/532,812, filed on Nov. 4, 2014, now abandoned.

(51) Int. Cl.
*H04L 29/06* (2006.01)
*G06N 7/00* (2006.01)
*G06N 5/04* (2006.01)

(52) U.S. Cl.
CPC ............. *H04L 63/20* (2013.01); *G06N 5/047* (2013.01); *G06N 7/005* (2013.01); *H04L 63/1416* (2013.01); *H04L 63/1425* (2013.01); *G06F 2221/2101* (2013.01); *H04L 63/1441* (2013.01); *H04L 2463/102* (2013.01)

(58) Field of Classification Search
CPC . H04L 63/20; H04L 63/1416; H04L 63/1425; H04L 63/1441; H04L 2463/102; G06N 5/047; G06N 7/005; G06F 2221/2101
See application file for complete search history.

(56) References Cited

U.S. PATENT DOCUMENTS 9,661,025 B2 * 5/2017 Bassias ............... H04L 63/1425
2008/0168135 A1 * 7/2008 Redlich ................. G06Q 10/10
709/204

(Continued)

*Primary Examiner* — Sarah Su
(74) *Attorney, Agent, or Firm* — Hulsey PC (57) ABSTRACT

Methods and apparatuses employing outlier score detection method and apparatus for identifying and detecting threats to an enterprise or e-commerce system are disclosed, including grouping log lines belonging to one or more log line parameters from one or more enterprise or e-commerce system data sources and/or from incoming data traffic to the enterprise or e-commerce system; extracting one or more features from the grouped log lines into one or more features tables; using one or more statistical models on the one or more features tables to identify statistical outliers; using the one or more features tables to create one or more rules for identifying threats to the enterprise or e-commerce system; and using the one or more rules on incoming enterprise or e-commerce system data traffic to detect threats to the enterprise or e-commerce system. Other embodiments are described and claimed.

20 Claims, 5 Drawing Sheets

(56) References Cited

U.S. PATENT DOCUMENTS

| | | | |
|---|---|---|---|
| 2014/0278435 A1* | 9/2014 | Ganong, III | G10L 15/22 704/275 |
| 2015/0229662 A1* | 8/2015 | Hitt | H04L 63/1425 726/23 |
| 2017/0169360 A1* | 6/2017 | Veeramachaneni | G06N 99/005 |
| 2017/0272471 A1* | 9/2017 | Veeramachaneni | H04L 63/1425 |

* cited by examiner

COMPUTER-IMPLEMENTED PROCESS AND SYSTEM EMPLOYING OUTLIER SCORE DETECTION FOR IDENTIFYING AND DETECTING SCENARIO-SPECIFIC DATA ELEMENTS FROM A DYNAMIC DATA SOURCE

CROSS-REFERENCE TO RELATED APPLICATIONS

This application is related to and is a continuation-in-part of U.S. Utility patent application Ser. No. 14/532,812 filed Nov. 4, 2014.

This Application expressly incorporates by reference U.S. Utility patent application Ser. No. 14/532,812 filed Nov. 4, 2014.

BACKGROUND

The invention relates generally to the field of identifying and detecting scenario-specific data elements from a dynamic data source, such as threats to an enterprise or e-commerce system. More particularly, the invention relates to a scalable method and scalable apparatus that employs outlier score detection for building multivariate representations of non-Gaussian marginal distributions for detecting scenario-specific data elements from a dynamic data source, such as by automatically identifying and detecting statistical outliers of one or more enterprise or e-commerce systems.

SUMMARY

In one respect, disclosed is a method for outlier score detection for processes for identifying and detecting scenario-specific data elements from a dynamic data source, such as threats to an enterprise or e-commerce system. The method includes, for example, the steps of grouping log lines belonging to one or more log line parameters from one or more enterprise or e-commerce system data sources and/or from incoming data traffic to the enterprise or e-commerce system. Next, the process extracts one or more features from the grouped log lines into one or more features tables. Using one or more statistical models on the one or more features tables, the novel method and system identify statistical outliers.

In one respect, disclosed is an apparatus for identifying and detecting scenario-specific data elements from a dynamic data source, such as threats to an enterprise or e-commerce system. The apparatus includes one or more processors. System memory couples to the one or more processors. One or more non-transitory memory units couple to the one or more processors. The scenario-specific data elements from a dynamic data source may be stored on the one or more non-transitory memory units, when executed by the one or more processors are configured to perform a method, comprising parameters from one or more dynamic data sources, such as a enterprise or e-commerce system data sources and/or from incoming data traffic to the enterprise or e-commerce system. The process involves extracting one or more features from the grouped log lines into one or more features tables; using one or more statistical models on the one or more features tables to identify statistical outliers.

In another respect, disclosed is an apparatus for identifying and detecting scenario-specific data elements from a dynamic data source, such as threats to an enterprise or e-commerce system. The apparatus includes a pattern discoverer; one or more pattern normalizers coupled to the pattern discover; and one or more threat detectors coupled to the pattern discover; wherein at least one of the one or more pattern normalizers comprise:

One or more pattern normalizer processors; pattern normalizer system memory coupled to the one or more pattern normalizer processors;

One or more pattern normalizer non-transitory memory units coupled to the one or more pattern normalizer processors;

A pattern normalizer communications device coupled to the one or more pattern normalizer processors, the pattern normalizer communications device being configured to communicate with the pattern discover; and Pattern normalizer code stored on the one or more pattern normalizer non-transitory memory units that when executed by the one or more pattern normalizer processors are configured to perform a pattern normalizer method, comprising:
a. grouping scenario-specific data elements belonging to one or more sets of parameters from one or more enterprise or e-commerce system data sources and/or from incoming data traffic to the enterprise or e-commerce system;
b. extracting one or more features scenario-specific data elements from a dynamic data source into one or more features tables; and
c. sending the one or more features tables to the pattern discoverer; wherein the pattern discoverer comprises: one or more pattern discoverer processors;
d. pattern discoverer system memory coupled to the one or more pattern discoverer processors; one or more pattern discoverer non-transitory memory units coupled to the one or more pattern discoverer processors;
e. a pattern discoverer communications device coupled to the one or more pattern discoverer processors, the pattern discoverer communications device being configured to communicate with the one or more pattern normalizers, from the one or more features tables identifies statistical outliers from the scenario-specific data.

The presently disclosed aspect of outlier score detection provides a method and system for identifying and detecting threats to an enterprise or e-commerce system that coordinates output from a combination of a plurality of outlier detection modules. At least a subset of the outlier detection modules operate an outlier detection algorithm distinct from the outlier detection algorithms operating on other outlier detection modules within the combination of outlier detection modules.

At least a subset of the combination of outlier detection modules assigns to the features from the grouped log lines a score of feature incongruity and associates a ranking for the features according to the score of feature incongruity. The combination of outlier detection modules may have varying robustness properties, wherein the score of the feature incongruity potentially ranges across a variety of different measurement ranges. The score of the feature incongruity potentially may also range across a variety of different measurement directions. For example, a subset of the combination of outlier detection modules may identify the statistical outliers according to a highest score. Others may identify the statistical outliers according to a lowest score.

The process entails first computing the negative logarithm of scores of feature incongruity in the event that selected ones of the combination of outlier detection modules generate scores varying by tens of orders of magnitude and may shift the scores to make certain that they have positive support if needed. Thereafter, the combination of outlier detection modules further projects the scores of feature incongruity into a common probability space.

When executed by the one or more threat detector processors are configured to perform a threat detector method, comprising: using the one or more rules on the incoming data traffic to the enterprise or e-commerce system to detect threats to the enterprise or e-commerce system. Numerous additional embodiments are also possible.

BRIEF DESCRIPTION OF THE DRAWINGS

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims. Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims. Other objects and advantages of the invention may become apparent upon reading the detailed description and upon reference to the accompanying drawings.

DETAILED DESCRIPTION

One or more embodiments of the invention are described It should be noted that these and any other embodiments are exemplary and are intended to be illustrative of the invention rather than limiting. While the invention is widely applicable to different types of systems, it is impossible to include all the possible embodiments and contexts of the invention in this disclosure. Upon reading this disclosure, many alternative embodiments of the present invention will be apparent to persons of ordinary skill in the art.

The computer-implemented process employing outlier score detection of the present disclosure included instructions and process steps for identifying and detecting scenario-specific data elements from a dynamic data source has numerous potential embodiments. On such embodiment may relate to identifying and detecting malicious or unauthorized use of enterprise or e-commerce systems. The results of these kinds of attacks can be seen in the daily reports about breach and fraud. Unfortunately, roughly 70% of these activities are discovered or detected by the end users or by third parties. This is the case since current cyber security infrastructure uses simplistic, static rules and signatures that are backward looking and therefore cannot catch what has not been seen before.

Typically, information about the malicious or unauthorized use of enterprise or e-commerce systems is captured by current cyber security infrastructure, but are merely indexed and stored for search and retrieval during forensics. Once a malicious or unauthorized use is discovered and a new breach or fraud identified, new rules and signatures are implemented to the current cyber security infrastructure. Eventually though, malicious or unauthorized users are successful in bypassing the new rules and signatures and the whole process of discovery by a third party or end user, forensics by the victim, and subsequent rule creation starts again. Current cyber security infrastructure is not capable of identifying and detecting malicious or unauthorized usage that is capable of circumventing enterprise or e-commerce systems' firewalls and rules, leading to an increase in breach and fraud.

The embodiment or embodiments described herein makes use of computer-implemented process employing outlier score methods and apparatuses to solve these problems and others by proposing a new method and apparatus for identifying and detecting threats to an enterprise or e-commerce system. The new method and apparatus uses a multi-dimensional statistical analysis of multiple extracted features from one or more enterprise or e-commerce system data sources and/or from incoming data traffic to the enterprise or e-commerce system to identify outliers. Such an embodiment of the disclosed subject matter makes use of the fact that statistical outliers are where malicious or unauthorized usage may be found. The process and apparatus of the present disclosure may then be used in the real-time detection of malicious or unauthorized use of the enterprise or e-commerce system.

Figure 1:
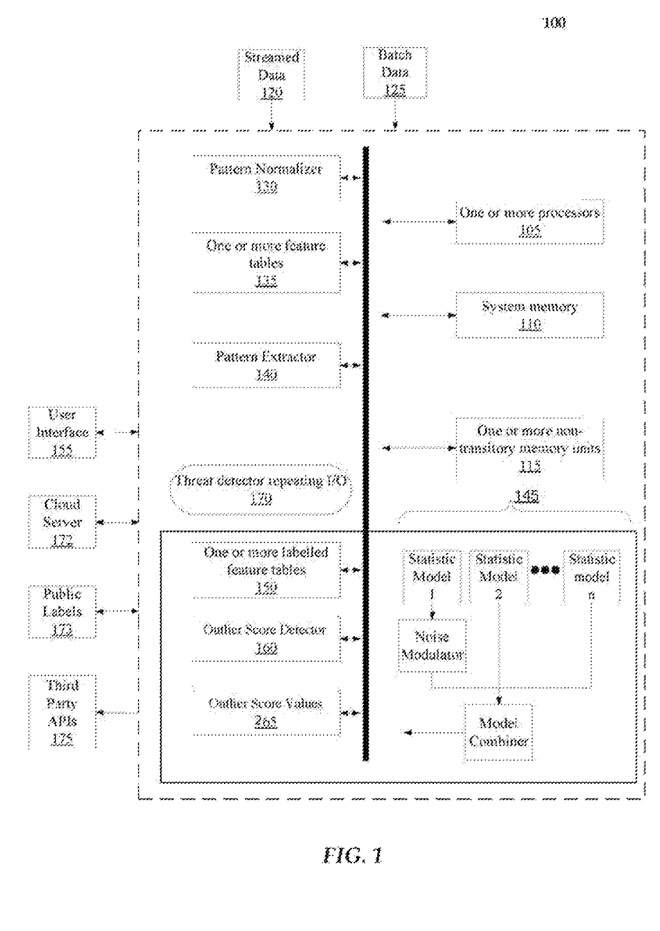
FIG. 1 is a block diagram illustrating an architectural constituents of the apparatus for computer-implemented process and system employing outlier score detection of present disclosure.

FIG. 1 is for identifying and a block diagram illustrating an apparatus detecting threats to an enterprise or e-commerce system, in accordance with some embodiments. In some embodiments, apparatus 100 comprises one or more processors 105, system memory 110, and one or more non-transitory memory units 115, all of which are directly or indirectly coupled to each other. Streamed data 120 and/or batch data 125 is fed into the apparatus 100 where a pattern normalizer 130 which comprises code stored on the one or more non-transitory memory units that when executed by the one or more processors are configured to parse the streamed data 120 and/or batch data 125 by grouping or bunching log lines belonging to one or more log line parameters and then extracting one or more features from the grouped log lines into one or more features tables 135. The streamed data 120 comprises incoming data traffic to an enterprise or e-commerce system. The batch data 125 comprises web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers.

The data specific data element parameters comprise at least one of: user ID, session, IP address, and URL query. The features of a features table, organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table, organized or grouped by URL queries, comprises at least one of: length of user URL query, number of characters of user URL query, number of digits of user URL query, and number of punctuations of user URL query. The features of a features table, organized or grouped by user ID, comprises at least one of: number of checkouts, number of credit cards added, number of promo codes added, number of gift cards added, number of times items were shipped overnight, and number of times new shipping address was added.

The features of a features table, organized or grouped by IP address, comprises at least one of: number of login failures, number of login successes, number of password resets, and total number of requests. In some embodiments, the one or more features tables comprise a matrix where the features are arranged by column and the one or more log line parameters make up the rows. The one or more features tables 135 are then sent to a pattern extractor 140 where the pattern extractor 140 which comprises code stored on the one or more non-transitory memory units that when executed by the one or more processors are configured to use one or more statistical models 145, such as Clustering models, PCA models, and Copula models, on the one or more features tables 135 to identify statistical outliers. Some embodiments may employ noise modulation of statistical mode prior to combination of the statistical models via model combiner. In the embodiment where the pattern extractor 140 uses the Copula models on the one or more features tables 135, the pattern extractor 140 applies a Copula function on all the features of the one or more features tables 135.

The Copula function comprises using various techniques to estimate a cumulative distribution function for each feature. In one embodiment, a kernel density estimation function is used to estimate the cumulative distribution function. Next, the cumulative distribution function for each feature is used to calculate a U-matrix. The inverse of the U-matrix is then normalized and a RHOHAT computed. The RHOHAT and U-matrix are then used to compute the joint probability distribution of each row of a feature table. In some embodiments, the one or more log line parameters of the one or more features tables 135 are ranked and rearranged by probability by the pattern extractor 140.

The one or more rules 165 may then be sent to one or more threat detectors 170 for real-time monitoring of the streamed data 120. The one or more rules 165 may also be posted to a cloud server 172 or distributed to other third parties 175 to be used in their firewall rules set. In various embodiments, the outlier score values may be labeled as malicious, non-malicious, or other administrator defined label or public labels 173 in order to create one or more labeled features tables 150. In some embodiments, the statistical outliers may be presented onto a user interface 155 so that an administrator of the enterprise or e-commerce system may manually identify the statistical outliers as malicious, non-malicious, or other administrator defined label. If threats are not detected by the one or more threat detectors 170, the incoming data traffic can continue to the enterprise or e-commerce system. If threats are detected by the one or more threat detectors 170, the incoming data traffic to the enterprise or e-commerce system may be blocked and/or challenged. In some embodiments, if a threat is detected, the detected threat may be used to modify the one or more statistical models 145 used by the pattern extractor 140 and/or to modify the outlier score values 165 generated by the outlier score detector 160.

In some embodiments, the pattern extractor 140 may be fully distributed across multiple server class machines to scale the processing of a large number, i.e. billions, of rows of log line parameters. To scale across the features of the one or more features tables 135, each node of the multiple server class machines performs all the one or more statistical models on a group of features and a master node of the multiple server class machines aggregates the results from all the nodes of the multiple server class machines. To scale across the rows of one or more log line parameters of the one or more features tables 135, the pattern extractor 140 may intelligently sample the rows of one or more log line parameters by using a technique called bag of little bootstraps. The bag of little bootstraps functions by averaging the results of bootstrapping multiple small subsets of log line parameters.

Figure 2:
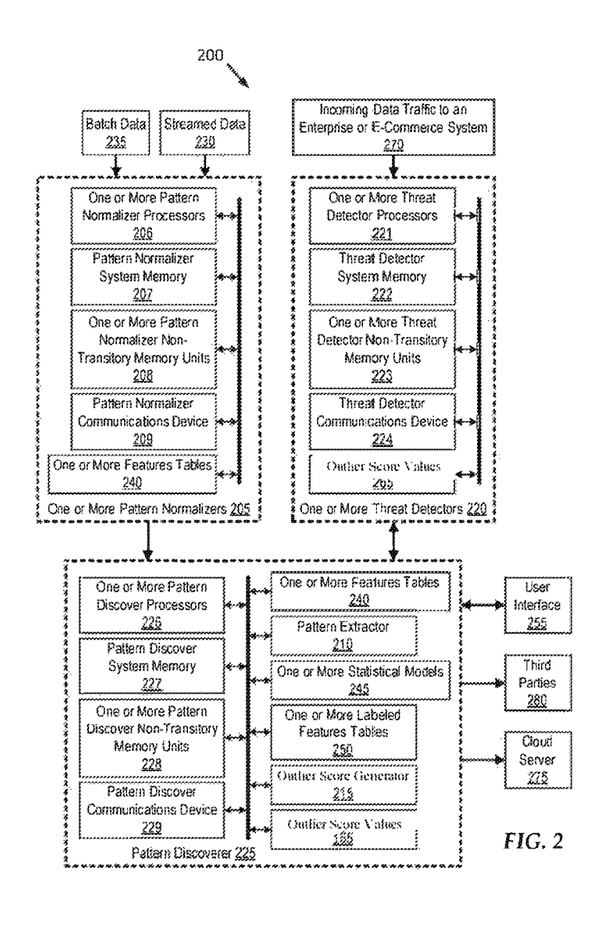
FIG. 2 is a block diagram illustrating the respective functions of computer-implemented process and system employing outlier score detection for identifying and detecting scenario-specific data elements from a dynamic data source according to teachings of the present disclosure.

FIG. 2 shows a block diagram illustrating and apparatus for outlier score detection for identifying scenario specific data elements from a dynamic data source, and in the disclosed embodiment, an apparatus for detecting threats to an enterprise or e-commerce system, in accordance with some embodiments. In some embodiments, apparatus 200 comprises one or more pattern normalizers 205, a pattern extractor 210, a rule generator 215, and one or more threat detectors 220 separated over one or more computing systems. In one embodiment, the pattern extractor 210 and the rule generator 215 are integrated together as a pattern discoverer 225 onto a single computing system. In the embodiment illustrated in FIG. 2, at least one of the one or more pattern normalizers 205 comprise one or more pattern normalizer processors 206, pattern normalizer system memory 207, one or more pattern normalizer non-transitory memory units 208, and a pattern normalizer communications device 209, all of which are directly or indirectly coupled to each other, and pattern normalizer code stored on the one or more pattern normalizer non-transitory memory units that when executed by the one or more pattern normalizer processors are configured to perform a pattern normalizer method. The pattern discoverer 225 comprises one or more pattern discoverer processors 226, pattern discoverer system memory 227, one or more pattern discoverer non-transitory memory units 228, and a pattern discoverer communications device 229, all of which are directly or indirectly coupled to each other, and pattern discoverer code stored on the one or more pattern discoverer non-transitory memory units that when executed by the one or more pattern discoverer processors are configured to perform a pattern discoverer method.

The at least one of the one or more threat detectors 220 comprise one or more threat detector processors 221, threat detector system memory 222, one or more threat detector non-transitory memory units 223, and a threat detector communications device 224, all of which are directly or indirectly coupled to each other, and threat detector code stored on the one or more threat detector non-transitory memory units that when executed by the one or more threat detector processors are configured to perform a threat detector method. In apparatus 200, streamed data 230 and/or batch data 235 is fed into the one or more pattern normalizers 205. The one or more pattern normalizers 205 parse the streamed data 230 and/or batch data 235 by grouping or bunching log lines belonging to one or more log line parameters and extracting one or more features from the grouped log lines into one or more features tables 240. The streamed data 230 comprises incoming data traffic to an enterprise of e-commerce system. The batch data 235 comprises web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers.

The outlier score detection parameters comprise at least one of: user ID, session, IP address, and URL query. The features of a features table 240, organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table 240, organized or grouped by URL queries, comprises at least one of: length of user URL query, number of characters of user URL query, number of digits of user URL query, and number of punctuations of user URL query. The features of a features table 240, organized or grouped by user ID, comprises at least one of: number of checkouts, number of credit cards added, number of promo codes added, number of gift cards added, number of times items were shipped overnight, and number of times new shipping address was added.

The features of a features table 240, organized or grouped by IP address, comprises at least one of: number of login failures, number of login successes, number of password resets, and total number of requests. In some embodiments, the one or more features tables 240 comprise a matrix where the features are arranged by column and the one or more log line parameters make up the rows. The one or more features tables 240 are then sent to the pattern discoverer 225, where the pattern extractor 210 uses one or more statistical models 245, such as Clustering models, PCA model, and Copula models, on the one or more features tables 240 to identify statistical outliers. In the embodiment where the pattern extractor 210 uses the Copula models on the one or more features tables 240, the pattern extractor 210 applies a Copula function on all the features of the one or more features tables 240. The Copula function comprises using various techniques to estimate a cumulative distribution function for each feature. In one embodiment, a kernel density estimation function is used to estimate the cumulative distribution function. Next, the cumulative distribution function of each feature is used to calculate a U-matrix. The inverse of the U-matrix is then normalized and a RHOHAT computed. The pattern extractor 210 then uses the RHOHAT and U-matrix to compute joint probability distributions of each row of a feature table. In some embodiments, the one or more log line parameters of the one or more features tables 240 are ranked and rearranged by probability by the pattern extractor 210.

The one or more rules 265 that are created are essentially behavioral rules based on a multi-dimensional view of the incoming streamed data 230 and/or batch data 235. The one or more rules 265 may then be sent to one or more threat detectors 220 for real-time monitoring of incoming data traffic to an enterprise or e-commerce system 270. The one or more rules 265 may also be posted to a cloud server 275 or distributed to other third parties 280 to be used in their firewall rules set. In certain embodiments, the statistical outliers may be labeled as malicious, non-malicious, or other administrator defined label in order to create one or more labeled features tables 250. In some embodiments, the statistical outliers may be presented onto a user interface 255 so that an administrator of the enterprise or e-commerce system may manually identify the statistical outliers as malicious, non-malicious, or other administrator defined label. If threats are not detected by the one or more threat detectors 220, the incoming data traffic 270 can continue to the enterprise or e-commerce system. If threats are detected by the one or more threat detectors 220, the incoming data traffic to the enterprise or e-commerce system 270 may be blocked and/or challenged. In some embodiments, if a threat is detected, the detected threat may be used to modify the one or more statistical models 245 used by the pattern extractor 210 and/or to modify the one or more rules 265 generated by the statistical rule generator 215.

In some embodiments, the pattern discoverer 225 may be fully distributed across multiple server class machines to scale the processing of a large number, i.e. billions, of rows of log line parameters. To scale across the features of the one or more features tables 240, each node of the multiple server class machines performs all the one or more statistical models on a group of features and a master node of the multiple server class machines aggregates the results from all the nodes of the multiple server class machines. To scale across the rows of one or more log line parameters of the one or more features tables 240, the pattern extractor 210 may intelligently sample the rows of one or more log line parameters by using a technique called bag of little bootstraps. The bag of little bootstraps functions by averaging the results of bootstrapping multiple small subsets of log line parameters.

The presently disclosed subject matter provides a method and system for outlier score detection in identifying and detecting scenario specific data elements from a dynamic data source, such as threats to an enterprise or e-commerce system that coordinates output from a combination of a plurality of outlier detection modules. At least a subset of the outlier detection modules operate an outlier detection algorithm distinct from the outlier detection algorithms operating on other outlier detection modules within the combination of outlier detection modules.

At least a subset of the combination of outlier detection modules assigns to the features from statistical outliers a score of feature incongruity and associates a ranking for the features according to the score of feature incongruity. Each of the combination of outlier detection modules may have varying robustness properties, wherein the score of the feature incongruity potentially ranges across a variety of different measurement ranges. The score of the feature incongruity potentially may also range across a variety of different measurement directions. For example, a subset of the combination of outlier detection modules may identify the statistical outliers according to a highest score. Others may identify the statistical outliers according to a lowest score.

When employing a Copula method, the process entails first computing the negative logarithm of scores of feature incongruity in the event that selected ones of the combination of outlier detection modules generate scores varying by tens of orders of magnitude and may shift the scores to make certain that they have positive support if needed. Thereafter, the combination of outlier detection modules further projects the scores of feature incongruity into a common probability space.

The method and system of the present disclosure may translate scores to probabilities for a given score, S. For this aspect of the present disclosure, the steps include evaluating the cumulative density of the Weibull distribution at the given score $S:F(S)=P(X<S)$ The steps further include computing the negative logarithm of scores of feature incongruity in the event that there is need for tail modeling and obtaining a final score for the probabilities by remodeling the probabilities using a Weibull distribution. The probability space ranges in value from 0 to a valuable representing a maximum number available to the computing apparatus. The process further includes remapping the scores of feature incongruity having been mapped into a common probability space to a probability space defined by [0, 1-max_tail_score], where the value of 1-max_tail_score relates to an associated computing machinery. Computing a tail score for each of the feature vectors follows the the formula: $score=\log(1/(1-P))$.

Following the above outlier score detection steps, the disclosed process takes the step of combining the output of the combination of outlier detection modules for improving process robustness through compensation of individual biases associated with each of the outlier detection modules.

Figure 3:
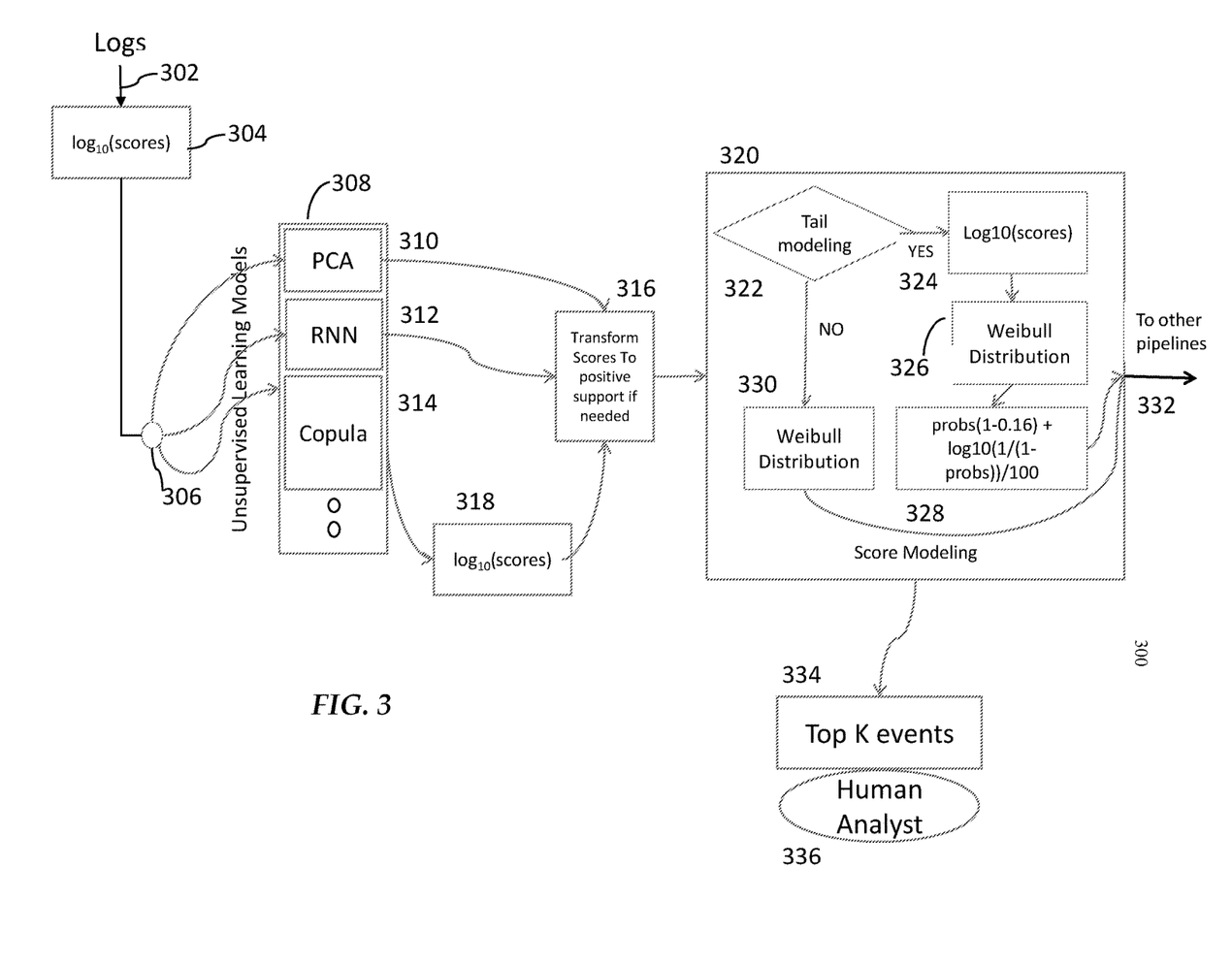
FIG. 3 is a block diagram illustrating the outlier score detection process for identifying and detecting scenario-specific data elements from a dynamic data source.

FIG. 3 provides a process flow schematic 300 for data processing for score modeling in a single pipeline where process flow arrives from logs 302 to flow to feature extraction table 304. From feature extraction table 304, process flow continues to node 306, where the decision of flow routing takes place. Flow routing may continue to unsupervised learning modules 308. Unsupervised learning modules 308 may include PCA function 310, RNN function 312, and Copula function 314. PCA function 310 and RNN function 312 output to score modeling function 316. Copula function 314 outputs to transform scores function 318 for the calculation the quantify, log10(scores)+max(log10(scores)) and then outputting to score modeling function 316. From transform scores function 316, process flow continues to score modeling function 320. In scores modeling function 320, tail modeling decision 322 at "yes" causes flow to continue to Log10(scores) function 324, which feeds to Weibull Distribution function 326. Function 328 receives output from Weibull distribution function 326 for a probability determination of probs (1-0.16)+log10(1/(1-probs))/100. If decision 322 "no," then process flow continues to Weibull distribution function 330. From function 328 and/or Weibull distribution function 330, process flow may continue to either other pipeline 332 or to Top K events analysis function 334. From top K events function 334, process flow may continue to human analyst function 336.

Figure 4:
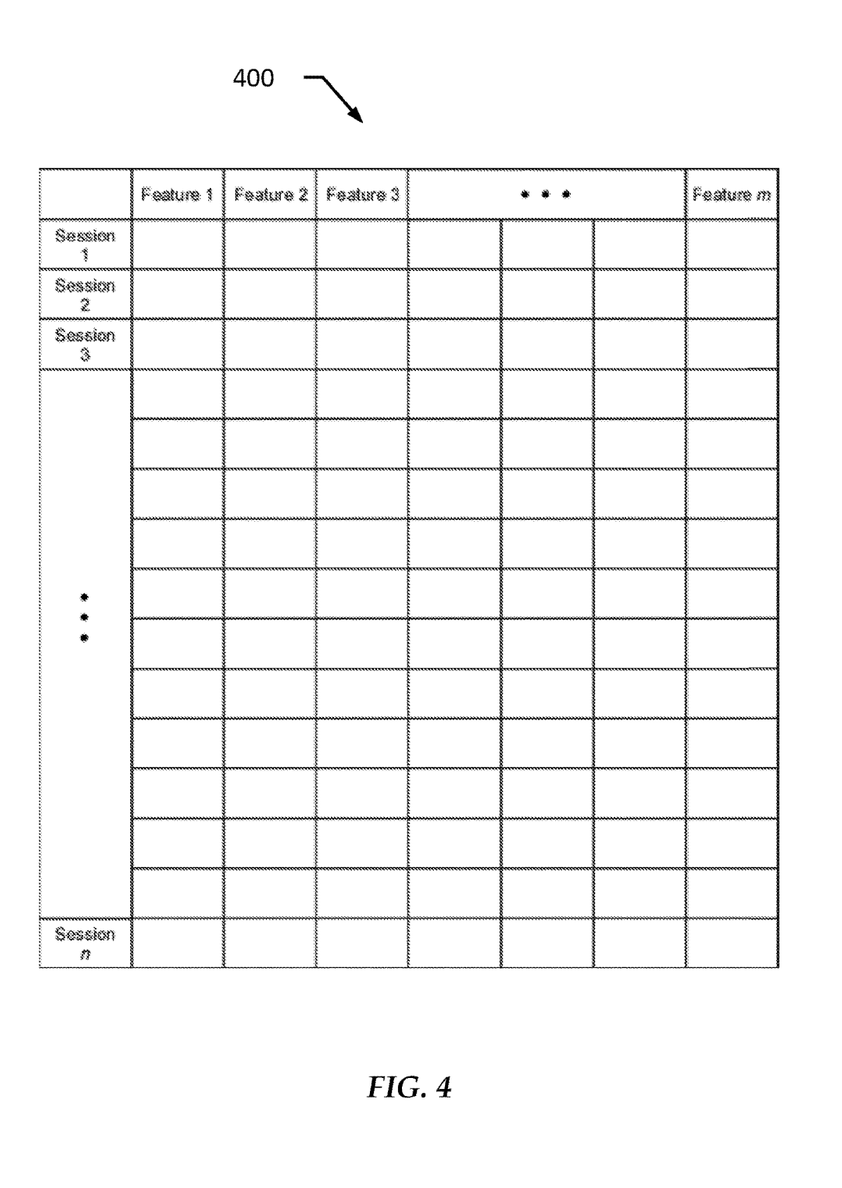
FIG. 4 is a table showing a features table, in accordance with some embodiments.

FIG. 4 is a features table, in accordance with some embodiments. In some embodiments, a pattern normalizer parses streamed data and/or batch data by grouping or bunching statistical outlier scores belonging to one or more statistical data element parameters and then extracting features from the one or more log line parameters into one or more features tables. The streamed data comprises incoming data traffic to an enterprise or e-commerce system. The batch data comprises web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more statistical outlier parameters may include at least one of: user ID, session, IP address, and URL query. The one or more features tables may be created at one day, seven day, and/or thirty day periods.

The features table 400, organized or grouped by session from Session 1 to Session n, includes one or more columns of session features, Features 1 to Features m, comprising at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table, organized or grouped by URL queries, comprises at least one of: length of user URL query, number of characters of user URL query, number of digits of user URL query, and number of punctuations of user URL query. The features of a features table, organized or grouped by user ID, comprises at least one of: number of checkouts, number of credit cards added, number of promo codes added, number of gift cards added, number of times items were shipped overnight, and number of times new shipping address was added. The features of a features table, organized or grouped by IP address, comprises at least one of: number of login failures, number of login successes, number of password resets, and total number of requests.

Figure 5:
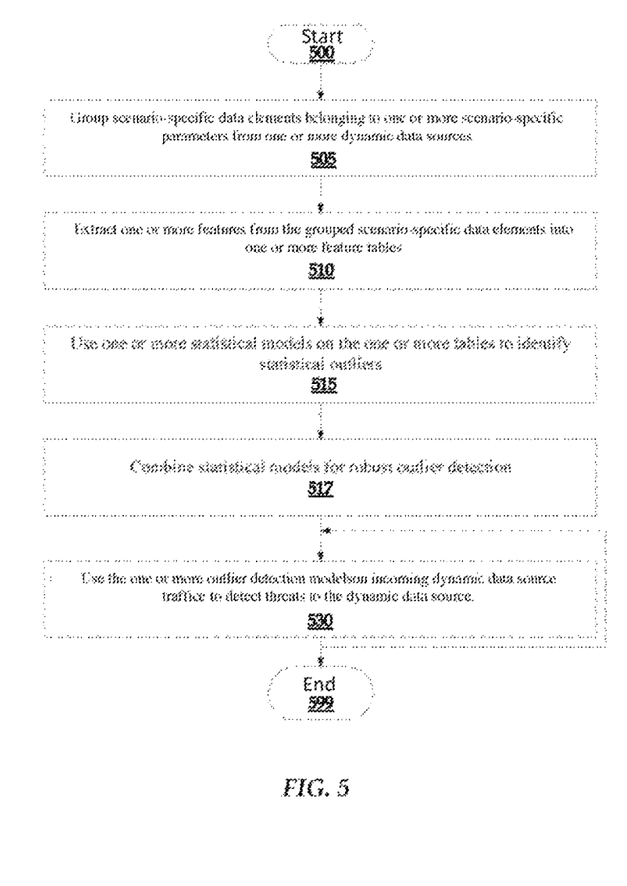
FIG. 5 is a flow chart illustrating a method for identifying and detecting threats to an enterprise or e-commerce system, in accordance with some embodiments.

FIG. 5 is a block diagram illustrating a method for use of the statistical outlier detection process and apparatus of the present disclosure for identifying and detecting threats to an enterprise or e-commerce system. In some embodiments, the method illustrated for identifying and detecting threats to an enterprise or e-commerce system in FIG. 5 may be performed by one or more of the apparatuses and feature tables illustrated in FIG. 1 through FIG. 4. Processing begins at 500 whereupon, at block 505, scenario-specific data elements belonging to one or more scenario-specific parameters from one or more dynamic data sources are grouped. This may comprise grouping log lines belonging to one or more log line parameters from one or more enterprise or e-commerce system data sources and/or from incoming data traffic to the enterprise or e-commerce system. The one or more enterprise or e-commerce system data sources comprises at least one of: web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more log line parameters comprises at least one of: user ID, session, IP address, and URL query.

At block 510, one or more features are extracted from the grouped scenario-specific data elements into one or more features tables. The features of a features table organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table, organized or grouped by URL queries, comprises at least one of: length of user URL query, number of characters of user URL query, number of digits of user URL query, and number of punctuations of user URL query. The features of a features table, organized or grouped by user ID, comprises at least one of: number of checkouts, number of credit cards added, number of promo codes added, number of gift cards added, number of times items were shipped overnight, and number of times new shipping address was added. The features of a features table, organized or grouped by IP address, comprises at least one of: number of login failures, number of login successes, number of password resets, and total number of requests.

At block 515, one or more statistical models are used on the one or more features tables to identify statistical outliers. The one or more statistical models comprises at least one of: Clustering models, PCA models, and Copula models. In the embodiment where a Copula model is used, a Copula function is applied on all the one or more extracted features. The Copula function comprises using various techniques to estimate a cumulative distribution function for each feature. In one embodiment, a kernel density estimation function is used to estimate the cumulative distribution function. Next, the cumulative distribution function of each feature is used to calculate a U-matrix. The inverse of the U-matrix is then normalized and a RHOHAT computed. The RHOHAT and U-matrix are then used to compute the joint probability distribution of each row of a feature table.

At block 517, the disclosed process combines statistical models for robust outlier detection. In some embodiments, the statistical outlier parameters of the one or more features tables are ranked and rearranged by probability. In some embodiments, using one or more statistical models on the one or more features tables from the one or more enterprise or e-commerce system data sources to identify statistical outliers comprises: distributing one or more features from the one or more features tables across two or more servers; using the one or more statistical models on the distributed one or more features; and aggregating results from the using the one or more statistical models on the distributed one or more features.

At block 530, the one or more statistical outliers for incoming enterprise or e-commerce system data traffic are identified to detect threats to the enterprise or e-commerce system. In some embodiments, the threat detection is done in real-time. If threats are detected, the incoming data traffic to the enterprise or e-commerce system may be blocked and/or challenged. In some embodiments, if a threat is detected, the detected threat may be used to modify the one or more statistical models and/or to modify the one or more rules. Processing subsequently ends at 599.

Some embodiments described herein relate to a computer storage product with one or more non-transitory memory units having instructions or computer code thereon for performing various computer-implemented operations. The one or more memory units are non-transitory in the sense that they do not include transitory propagating signals per se (e.g., a propagating electromagnetic wave carrying information on a transmission medium such as space or a cable). The one or more memory units and computer code (also can be referred to as code) may be those designed and constructed for the specific purpose or purposes. Examples of one or more memory units include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, Python, C, or other programming languages (e.g., object-oriented programming languages) and development tools. Additional examples of computer code include, but are not limited to, control signals, encrypted code, database code, and compressed code. Embodiments of distributed database code may be implemented using Hadoop/HDFS, Cassandra, or other database technologies.

The previous description of the disclosed embodiments is provided to enable any person skilled in the art to make or use the present invention. Various modifications to these embodiments will be clear to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above regarding specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for identifying and detecting scenario-specific data elements from a dynamic data source, comprising threats to an enterprise or e-commerce system, the method comprising: grouping scenario-specific data elements into grouped log lines, the scenario-specific data elements belonging to one or more scenario-specific data element parameters from one or more dynamic data sources and/or from incoming data traffic to the one or more dynamic data sources; extracting one or more features from the grouped log lines into one or more features tables, said features formed using a feature generator associated with the dynamic data sources; using one or more statistical models on the one or more features tables to identify statistical outliers; identifying said statistical outliers for further investigation by a human security analyst using a combination of outlier detection modules, coordinating output from said combination of a plurality of outlier detection modules, at least a subset of said outlier detection modules operating an outlier detection algorithm distinct from the outlier detection algorithms operating on other outlier detection modules within said combination of outlier detection modules; using the one or more features tables to create one or more adaptive rules for performing at least one of: further refining statistical models for identification of statistical outlier; and preventing access by categorized threats to the dynamic data sources, wherein the method results in improved security to the enterprise or e-commerce system.

2. The method of claim 1, wherein said scenario-specific data elements for the one or more dynamic data source comprises a malicious threat to an enterprise or e-commerce system.

3. The method of claim 2, wherein at least a subset of said combination of outlier detection modules assigns to said features from the grouped log lines a score of feature incongruity.

4. The method of claim 3, further comprising the step of associating a ranking for said features according to said score of feature incongruity.

5. The method of claim 3, wherein said combination of outlier detection modules have varying robustness properties, wherein said score of said feature incongruity potentially ranges across a variety of different measurement ranges.

6. The method of claim 3, wherein said combination of outlier detection modules have varying robustness properties, wherein said score of said feature incongruity potentially ranges across a variety of different measurement directions.

7. The method of claim 6, wherein a subset of said combination of outlier detection modules identify said statistical outliers according to a highest score.

8. The method of claim 6, wherein a subset of said combination of outlier detection modules identify said statistical outliers according to a lowest score.

9. The method of claim 6, further comprising steps of first computing a negative logarithm of scores of feature incongruity in the event that selected ones of said combination of outlier detection modules generate scores varying by tens of orders of magnitude.

10. The method of claim 6, further comprising of shifting said scores to make certain that they have positive support if needed.

11. The method of claim 6, wherein said combination of outlier detection modules further projects said scores of feature incongruity into a common probability space.

12. The method of claim 11, further comprising a step of modeling said scores of feature incongruity using a Weibull distribution modeling process.

13. The method of claim 12, wherein said Weibull distribution modeling process comprises the step of, for a given score, S, corresponding said outlier probability to a cumulative density function in $S:F(S)=P(X<S)$.

14. The method of claim 11, further comprising steps of first computing a negative logarithm of scores of feature incongruity in the event that there is need for tail modeling.

15. The method of claim 14, further comprising a step of obtaining a final score for said probabilities by remodeling said probabilities using a Weibull distribution.

16. The method of claim 15, where said probability space ranges in value from 0 to a value representing a maximum number available to a computing apparatus.

17. The method of claim 16, further comprising a step of remapping said scores of feature incongruity having been mapped into said common probability space to a probability space defined by [0, 1-max_tail_score], where the value of 1-max_tail_score relates to an associated computing machinery, and further comprising the step of computing on said associated computing machinery, a tail score for each of said feature vectors according to the formula: $score=\log(1/(1-P))$.

18. The method of claim 1, further comprising a step of combining the output of said combination of outlier detection modules for improving process robustness through compensation of individual biases associated with each of said outlier detection modules.

19. An apparatus for identifying and detecting threats to an enterprise or e-commerce system, the apparatus comprising: one or more hardware processors; system memory coupled to the one or more hardware processors; one or more non-transitory memory units coupled to the one or more hardware processors; and threat identification and detection code stored on the one or more non-transitory memory units that when executed by the one or more hardware processors are configured to perform a method which results in improved security to the enterprise or e-commerce system, the method comprising: grouping scenario-specific data elements into grouped log lines, said scenario-specific data elements belonging to one or more scenario-specific data element parameters from one or more dynamic data sources and/or from incoming data traffic to the dynamic data sources; extracting one or more features from the grouped log lines into one or more features tables, said features formed using a feature generator associated with the dynamic data sources; using one or more statistical models on the one or more features tables to identify statistical outliers; identifying said statistical outliers for further investigation by a human security analyst using a combination of outlier detection modules, coordinating output from said combination of a plurality of outlier detection modules, at least a subset of said outlier detection modules operating an outlier detection algorithm distinct from the outlier detection algorithms operating on other outlier detection modules within said combination of outlier detection modules; and using the one or more features tables to create one or more adaptive rules for performing at least one of: further refining statistical models for identification of statistical outliers; and preventing access by categorized threats to the dynamic data sources.

20. The method of claim 19, wherein said scenario-specific data elements for the one or more dynamic data source comprises a malicious threat to an enterprise or e-commerce system.

* * * * *